(12) United States Patent
Nowack et al.

(10) Patent No.: US 9,253,254 B2
(45) Date of Patent: Feb. 2, 2016

(54) SYSTEM AND METHOD FOR OFFERING A MULTI-PARTNER DELEGATED PLATFORM

(71) Applicant: Twilio, Inc., San Francisco, CA (US)

(72) Inventors: Matthew Nowack, San Bruno, CA (US); Timothy Milliron, Oakland, CA (US); Nicolas Acosta Amador, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

(21) Appl. No.: 14/155,223

(22) Filed: Jan. 14, 2014

(65) Prior Publication Data

US 2014/0201083 A1    Jul. 17, 2014

Related U.S. Application Data

(60) Provisional application No. 61/752,123, filed on Jan. 14, 2013.

(51) Int. Cl.
*H04L 29/08* (2006.01)
*H04L 29/06* (2006.01)

(52) U.S. Cl.
CPC .......... *H04L 67/104* (2013.01); *H04L 63/0823* (2013.01); *H04L 63/061* (2013.01)

(58) Field of Classification Search
CPC ....... H04L 63/08; H04L 63/083; H04L 63/10; H04W 12/06; G06F 21/31
See application file for complete search history.

(56) References Cited

U.S. PATENT DOCUMENTS

| | | | |
|---|---|---|---|
| 5,274,700 A | 12/1993 | Gechter et al. | |
| 5,526,416 A | 6/1996 | Dezonno et al. | |
| 5,581,608 A | 12/1996 | Jreij et al. | |
| 5,598,457 A | 1/1997 | Foladare et al. | |
| 5,934,181 A | 8/1999 | Adamczewski | |
| 6,026,440 A | 2/2000 | Shrader et al. | |
| 6,094,681 A | 7/2000 | Shaffer et al. | |
| 6,138,143 A | 10/2000 | Gigliotti et al. | |
| 6,185,565 B1 | 2/2001 | Meubus et al. | |
| 6,192,123 B1 | 2/2001 | Grunsted et al. | |
| 6,206,564 B1 | 3/2001 | Adamczewski | |
| 6,223,287 B1 | 4/2001 | Douglas et al. | |
| 6,232,979 B1 * | 5/2001 | Shochet .................. G06T 15/04 345/419 |
| 6,269,336 B1 | 7/2001 | Ladd et al. | |

(Continued)

FOREIGN PATENT DOCUMENTS

| | | |
|---|---|---|
| DE | 1684587 A | 3/1971 |
| EP | 0282126 A | 9/1988 |

(Continued)

OTHER PUBLICATIONS

NPL, "API Monetization Platform", 2013.*

(Continued)

*Primary Examiner* — Yonas Bayou
(74) *Attorney, Agent, or Firm* — Jeffrey Schox

(57) ABSTRACT

A system and method for offering a delegated platform that includes configuring a partner key of a partner record on a service platform with a partner; creating an account scoped within the partner record; receiving a session authentication request that specifies a partner assertion of a partner authenticated session request of the account; authenticating the session authentication request with the partner key; and rendering an embeddable account portal with a session of the account.

17 Claims, 7 Drawing Sheets

(56) References Cited

U.S. PATENT DOCUMENTS

| | | | |
|---|---|---|---|
| 6,317,137 B1 * | 11/2001 | Rosasco | G06T 15/005 345/467 |
| 6,373,836 B1 | 4/2002 | Deryugin et al. | |
| 6,425,012 B1 | 7/2002 | Trovato et al. | |
| 6,426,995 B1 | 7/2002 | Kim et al. | |
| 6,430,175 B1 | 8/2002 | Echols et al. | |
| 6,434,528 B1 | 8/2002 | Sanders | |
| 6,445,694 B1 | 9/2002 | Swartz | |
| 6,445,776 B1 | 9/2002 | Shank et al. | |
| 6,459,913 B2 | 10/2002 | Cloutier | |
| 6,493,558 B1 | 12/2002 | Bernhart et al. | |
| 6,496,500 B2 | 12/2002 | Johnson et al. | |
| 6,501,832 B1 | 12/2002 | Saylor et al. | |
| 6,507,875 B1 | 1/2003 | Mellen-Garnett et al. | |
| 6,577,721 B1 | 6/2003 | Vainio et al. | |
| 6,600,736 B1 | 7/2003 | Ball et al. | |
| 6,606,596 B1 | 8/2003 | Zirngibl et al. | |
| 6,614,783 B1 | 9/2003 | Sonesh et al. | |
| 6,625,258 B1 | 9/2003 | Ram et al. | |
| 6,625,576 B2 | 9/2003 | Kochanski et al. | |
| 6,636,504 B1 | 10/2003 | Albers et al. | |
| 6,662,231 B1 | 12/2003 | Drosset et al. | |
| 6,704,785 B1 | 3/2004 | Koo et al. | |
| 6,707,889 B1 | 3/2004 | Saylor et al. | |
| 6,711,249 B2 | 3/2004 | Weissman et al. | |
| 6,738,738 B2 | 5/2004 | Henton | |
| 6,757,365 B1 | 6/2004 | Bogard | |
| 6,765,997 B1 | 7/2004 | Zirngibl et al. | |
| 6,768,788 B1 | 7/2004 | Langseth et al. | |
| 6,778,653 B1 | 8/2004 | Kallas et al. | |
| 6,785,266 B2 | 8/2004 | Swartz | |
| 6,788,768 B1 | 9/2004 | Saylor et al. | |
| 6,792,086 B1 | 9/2004 | Saylor et al. | |
| 6,792,093 B2 | 9/2004 | Barak et al. | |
| 6,798,867 B1 | 9/2004 | Zirngibl et al. | |
| 6,807,529 B2 | 10/2004 | Johnson et al. | |
| 6,807,574 B1 | 10/2004 | Partovi et al. | |
| 6,819,667 B1 | 11/2004 | Brusilovsky et al. | |
| 6,820,260 B1 | 11/2004 | Flockhart et al. | |
| 6,829,334 B1 | 12/2004 | Zirngibl et al. | |
| 6,834,265 B2 | 12/2004 | Balasuriya | |
| 6,836,537 B1 | 12/2004 | Zirngibl et al. | |
| 6,842,767 B1 | 1/2005 | Partovi et al. | |
| 6,850,603 B1 | 2/2005 | Eberle et al. | |
| 6,870,830 B1 | 3/2005 | Schuster et al. | |
| 6,873,952 B1 | 3/2005 | Bailey et al. | |
| 6,874,084 B1 | 3/2005 | Dobner et al. | |
| 6,885,737 B1 | 4/2005 | Gao et al. | |
| 6,888,929 B1 | 5/2005 | Saylor et al. | |
| 6,895,084 B1 | 5/2005 | Saylor et al. | |
| 6,898,567 B2 | 5/2005 | Balasuriya | |
| 6,912,581 B2 | 6/2005 | Johnson et al. | |
| 6,922,411 B1 | 7/2005 | Taylor | |
| 6,931,405 B2 | 8/2005 | El-Shimi et al. | |
| 6,937,699 B1 | 8/2005 | Schuster et al. | |
| 6,940,953 B1 | 9/2005 | Eberle et al. | |
| 6,941,268 B2 | 9/2005 | Porter et al. | |
| 6,947,417 B2 | 9/2005 | Laursen et al. | |
| 6,947,988 B1 | 9/2005 | Saleh | |
| 6,961,330 B1 | 11/2005 | Cattan et al. | |
| 6,964,012 B1 | 11/2005 | Zirngibl et al. | |
| 6,970,915 B1 | 11/2005 | Partovi et al. | |
| 6,977,992 B2 | 12/2005 | Zirngibl et al. | |
| 6,985,862 B2 | 1/2006 | Stroem et al. | |
| 6,999,576 B2 | 2/2006 | Sacra | |
| 7,003,464 B2 | 2/2006 | Ferrans et al. | |
| 7,006,606 B1 | 2/2006 | Cohen et al. | |
| 7,010,586 B1 | 3/2006 | Allavarpu et al. | |
| 7,020,685 B1 | 3/2006 | Chen et al. | |
| 7,039,165 B1 | 5/2006 | Saylor et al. | |
| 7,062,709 B2 | 6/2006 | Cheung | |
| 7,076,037 B1 | 7/2006 | Gonen et al. | |
| 7,076,428 B2 | 7/2006 | Anastasakos et al. | |
| 7,089,310 B1 | 8/2006 | Ellerman et al. | |
| 7,103,003 B2 | 9/2006 | Brueckheimer et al. | |
| 7,103,171 B1 | 9/2006 | Annadata et al. | |
| 7,106,844 B1 | 9/2006 | Holland | |
| 7,111,163 B1 | 9/2006 | Haney | |
| 7,140,004 B1 | 11/2006 | Kunins et al. | |
| 7,143,039 B1 | 11/2006 | Stifelman et al. | |
| 7,197,331 B2 | 3/2007 | Anastasakos et al. | |
| 7,197,461 B1 | 3/2007 | Eberle et al. | |
| 7,197,462 B2 | 3/2007 | Takagi et al. | |
| 7,197,544 B2 | 3/2007 | Wang et al. | |
| 7,225,232 B2 | 5/2007 | Elberse | |
| 7,227,849 B1 | 6/2007 | Rasanen | |
| 7,260,208 B2 | 8/2007 | Cavalcanti | |
| 7,266,181 B1 | 9/2007 | Zirngibl et al. | |
| 7,269,557 B1 | 9/2007 | Bailey et al. | |
| 7,272,212 B2 | 9/2007 | Eberle et al. | |
| 7,272,564 B2 | 9/2007 | Phillips et al. | |
| 7,277,851 B1 | 10/2007 | Henton | |
| 7,283,515 B2 | 10/2007 | Fowler | |
| 7,286,521 B1 | 10/2007 | Jackson et al. | |
| 7,287,248 B1 | 10/2007 | Adeeb | |
| 7,289,453 B2 | 10/2007 | Riedel et al. | |
| 7,296,739 B1 | 11/2007 | Mo et al. | |
| 7,298,732 B2 | 11/2007 | Cho | |
| 7,308,085 B2 | 12/2007 | Weissman | |
| 7,308,408 B1 | 12/2007 | Stifelman et al. | |
| 7,324,633 B2 | 1/2008 | Gao et al. | |
| 7,324,942 B1 | 1/2008 | Mahowald et al. | |
| 7,328,263 B1 | 2/2008 | Sadjadi | |
| 7,330,463 B1 | 2/2008 | Bradd et al. | |
| 7,330,890 B1 | 2/2008 | Partovi et al. | |
| 7,340,040 B1 | 3/2008 | Saylor et al. | |
| 7,349,714 B2 | 3/2008 | Lee et al. | |
| 7,369,865 B2 | 5/2008 | Gabriel et al. | |
| 7,373,660 B1 | 5/2008 | Guichard et al. | |
| 7,376,223 B2 | 5/2008 | Taylor et al. | |
| 7,376,586 B1 | 5/2008 | Partovi et al. | |
| 7,376,733 B2 | 5/2008 | Connelly et al. | |
| 7,376,740 B1 | 5/2008 | Porter et al. | |
| 7,412,525 B2 | 8/2008 | Cafarella et al. | |
| 7,428,302 B2 | 9/2008 | Zirngibl et al. | |
| 7,440,898 B1 | 10/2008 | Eberle et al. | |
| 7,447,299 B1 | 11/2008 | Partovi et al. | |
| 7,454,459 B1 | 11/2008 | Kapoor et al. | |
| 7,457,397 B1 | 11/2008 | Saylor et al. | |
| 7,473,872 B2 | 1/2009 | Takimoto | |
| 7,486,780 B2 | 2/2009 | Zirngibl et al. | |
| 7,496,054 B2 | 2/2009 | Taylor | |
| 7,500,249 B2 | 3/2009 | Kampe et al. | |
| 7,505,951 B2 | 3/2009 | Thompson et al. | |
| 7,519,359 B2 | 4/2009 | Chiarulli et al. | |
| 7,522,711 B1 | 4/2009 | Stein et al. | |
| 7,536,454 B2 | 5/2009 | Balasuriya | |
| 7,552,054 B1 | 6/2009 | Stifelman et al. | |
| 7,571,226 B1 | 8/2009 | Partovi et al. | |
| 7,613,287 B1 | 11/2009 | Stifelman et al. | |
| 7,623,648 B1 | 11/2009 | Oppenheim et al. | |
| 7,630,900 B1 | 12/2009 | Strom | |
| 7,631,310 B1 | 12/2009 | Henzinger | |
| 7,644,000 B1 | 1/2010 | Strom | |
| 7,657,433 B1 | 2/2010 | Chang | |
| 7,657,434 B2 | 2/2010 | Thompson et al. | |
| 7,668,157 B2 | 2/2010 | Weintraub et al. | |
| 7,672,295 B1 | 3/2010 | Andhare et al. | |
| 7,675,857 B1 | 3/2010 | Chesson | |
| 7,676,221 B2 | 3/2010 | Roundtree et al. | |
| 7,715,547 B2 | 5/2010 | Ibbotson et al. | |
| 7,779,065 B2 | 8/2010 | Gupta et al. | |
| 7,875,836 B2 | 1/2011 | Imura et al. | |
| 7,882,253 B2 | 2/2011 | Pardo-Castellote et al. | |
| 7,920,866 B2 | 4/2011 | Bosch et al. | |
| 7,926,099 B1 | 4/2011 | Chakravarty et al. | |
| 7,936,867 B1 | 5/2011 | Hill et al. | |
| 7,962,644 B1 | 6/2011 | Ezerzer et al. | |
| 7,979,555 B2 | 7/2011 | Rothstein et al. | |
| 8,023,425 B2 | 9/2011 | Raleigh | |
| 8,069,096 B1 | 11/2011 | Ballaro et al. | |
| 8,081,958 B2 | 12/2011 | Soederstrom et al. | |
| 8,103,725 B2 | 1/2012 | Gupta et al. | |
| 8,126,128 B1 | 2/2012 | Hicks, III et al. | |

(56) References Cited

U.S. PATENT DOCUMENTS

| | | | |
|---|---|---|---|
| 8,149,716 B2 | 4/2012 | Ramanathan et al. | |
| 8,150,918 B1 | 4/2012 | Edelman et al. | |
| 8,156,213 B1 | 4/2012 | Deng et al. | |
| 8,185,619 B1* | 5/2012 | Maiocco | H04L 12/6418 709/203 |
| 8,196,133 B2 | 6/2012 | Kakumani et al. | |
| 8,233,611 B1 | 7/2012 | Zettner | |
| 8,243,889 B2 | 8/2012 | Taylor et al. | |
| 8,266,327 B2 | 9/2012 | Kumar et al. | |
| 8,295,272 B2 | 10/2012 | Boni et al. | |
| 8,306,021 B2 | 11/2012 | Lawson et al. | |
| 8,326,805 B1 | 12/2012 | Arous et al. | |
| 8,346,630 B1 | 1/2013 | McKeown | |
| 8,355,394 B2 | 1/2013 | Taylor et al. | |
| 8,417,817 B1 | 4/2013 | Jacobs | |
| 8,429,827 B1 | 4/2013 | Wetzel | |
| 8,438,315 B1 | 5/2013 | Tao et al. | |
| 8,462,670 B2 | 6/2013 | Chien et al. | |
| 8,509,068 B2 | 8/2013 | Begall et al. | |
| 8,532,686 B2 | 9/2013 | Schmidt et al. | |
| 8,542,805 B2 | 9/2013 | Agranovsky et al. | |
| 8,594,626 B1 | 11/2013 | Woodson et al. | |
| 8,611,338 B2 | 12/2013 | Lawson et al. | |
| 8,649,268 B2 | 2/2014 | Lawson et al. | |
| 8,667,056 B1 | 3/2014 | Proulx et al. | |
| 8,675,493 B2 | 3/2014 | Buddhikot et al. | |
| 8,755,376 B2 | 6/2014 | Lawson et al. | |
| 8,806,024 B1 | 8/2014 | Francis et al. | |
| 8,837,465 B2 | 9/2014 | Lawson et al. | |
| 8,838,707 B2 | 9/2014 | Lawson et al. | |
| 9,014,664 B2 | 4/2015 | Kim et al. | |
| 9,015,702 B2 | 4/2015 | Bhat | |
| 2001/0038624 A1* | 11/2001 | Greenberg | H04L 29/1216 370/352 |
| 2001/0043684 A1 | 11/2001 | Guedalia et al. | |
| 2002/0006124 A1 | 1/2002 | Jimenez et al. | |
| 2002/0006125 A1 | 1/2002 | Josse et al. | |
| 2002/0006193 A1 | 1/2002 | Rodenbusch et al. | |
| 2002/0067823 A1 | 6/2002 | Walker et al. | |
| 2002/0077833 A1 | 6/2002 | Arons et al. | |
| 2002/0126813 A1 | 9/2002 | Partovi et al. | |
| 2002/0136391 A1 | 9/2002 | Armstrong | |
| 2002/0165957 A1 | 11/2002 | Devoe et al. | |
| 2002/0176378 A1 | 11/2002 | Hamilton et al. | |
| 2002/0198941 A1 | 12/2002 | Gavrilescu et al. | |
| 2003/0006137 A1 | 1/2003 | Wei et al. | |
| 2003/0014665 A1 | 1/2003 | Anderson et al. | |
| 2003/0018830 A1 | 1/2003 | Chen et al. | |
| 2003/0026426 A1 | 2/2003 | Wright et al. | |
| 2003/0046366 A1 | 3/2003 | Pardikar et al. | |
| 2003/0051037 A1 | 3/2003 | Sundaram et al. | |
| 2003/0058884 A1 | 3/2003 | Kallner et al. | |
| 2003/0059020 A1 | 3/2003 | Meyerson et al. | |
| 2003/0060188 A1 | 3/2003 | Gidron et al. | |
| 2003/0061317 A1 | 3/2003 | Brown et al. | |
| 2003/0061404 A1 | 3/2003 | Atwal et al. | |
| 2003/0088421 A1 | 5/2003 | Maes et al. | |
| 2003/0103620 A1 | 6/2003 | Brown et al. | |
| 2003/0123640 A1 | 7/2003 | Roelle et al. | |
| 2003/0195990 A1 | 10/2003 | Greenblat | |
| 2003/0196076 A1 | 10/2003 | Zabarski et al. | |
| 2003/0211842 A1 | 11/2003 | Kempf et al. | |
| 2003/0231647 A1 | 12/2003 | Petrovykh | |
| 2004/0011690 A1 | 1/2004 | Marfino et al. | |
| 2004/0044953 A1 | 3/2004 | Watkins et al. | |
| 2004/0052349 A1 | 3/2004 | Creamer et al. | |
| 2004/0071275 A1 | 4/2004 | Bowater et al. | |
| 2004/0101122 A1 | 5/2004 | Da Palma et al. | |
| 2004/0102182 A1 | 5/2004 | Reith et al. | |
| 2004/0165569 A1 | 8/2004 | Sweatman et al. | |
| 2004/0172482 A1 | 9/2004 | Weissman et al. | |
| 2004/0205689 A1 | 10/2004 | Ellens et al. | |
| 2004/0213400 A1 | 10/2004 | Golitsin et al. | |
| 2004/0218748 A1 | 11/2004 | Fisher | |
| 2004/0228469 A1 | 11/2004 | Andrews et al. | |
| 2004/0240649 A1 | 12/2004 | Goel | |
| 2005/0005200 A1 | 1/2005 | Matena et al. | |
| 2005/0010483 A1 | 1/2005 | Ling | |
| 2005/0021626 A1 | 1/2005 | Prajapat et al. | |
| 2005/0025303 A1 | 2/2005 | Hostetler | |
| 2005/0038772 A1 | 2/2005 | Colrain | |
| 2005/0043952 A1 | 2/2005 | Sharma et al. | |
| 2005/0047579 A1 | 3/2005 | Salame | |
| 2005/0091572 A1 | 4/2005 | Gavrilescu et al. | |
| 2005/0125251 A1 | 6/2005 | Berger et al. | |
| 2005/0128961 A1 | 6/2005 | Miloslavsky et al. | |
| 2005/0135578 A1 | 6/2005 | Ress et al. | |
| 2005/0141500 A1 | 6/2005 | Bhandari et al. | |
| 2005/0147088 A1 | 7/2005 | Bao et al. | |
| 2005/0177635 A1 | 8/2005 | Schmidt et al. | |
| 2005/0181835 A1 | 8/2005 | Lau et al. | |
| 2005/0228680 A1 | 10/2005 | Malik | |
| 2005/0238153 A1 | 10/2005 | Chevalier | |
| 2005/0240659 A1 | 10/2005 | Taylor | |
| 2005/0243977 A1 | 11/2005 | Creamer et al. | |
| 2005/0246176 A1 | 11/2005 | Creamer et al. | |
| 2005/0289222 A1 | 12/2005 | Sahim | |
| 2006/0008073 A1 | 1/2006 | Yoshizawa et al. | |
| 2006/0015467 A1 | 1/2006 | Morken et al. | |
| 2006/0047666 A1 | 3/2006 | Bedi et al. | |
| 2006/0067506 A1 | 3/2006 | Flockhart et al. | |
| 2006/0129638 A1 | 6/2006 | Deakin | |
| 2006/0143007 A1 | 6/2006 | Koh et al. | |
| 2006/0168334 A1 | 7/2006 | Potti et al. | |
| 2006/0203979 A1 | 9/2006 | Jennings | |
| 2006/0209695 A1 | 9/2006 | Archer et al. | |
| 2006/0212865 A1 | 9/2006 | Vincent et al. | |
| 2006/0215824 A1 | 9/2006 | Mitby et al. | |
| 2006/0217823 A1 | 9/2006 | Hussey | |
| 2006/0217978 A1 | 9/2006 | Mitby et al. | |
| 2006/0222166 A1 | 10/2006 | Ramakrishna et al. | |
| 2006/0256816 A1 | 11/2006 | Yarlagadda et al. | |
| 2006/0262915 A1 | 11/2006 | Marascio et al. | |
| 2006/0270386 A1 | 11/2006 | Yu et al. | |
| 2006/0285489 A1 | 12/2006 | Francisco et al. | |
| 2007/0002744 A1 | 1/2007 | Mewhinney et al. | |
| 2007/0036143 A1 | 2/2007 | Alt et al. | |
| 2007/0050306 A1 | 3/2007 | McQueen | |
| 2007/0070906 A1 | 3/2007 | Thakur | |
| 2007/0070980 A1 | 3/2007 | Phelps et al. | |
| 2007/0071223 A1 | 3/2007 | Lee et al. | |
| 2007/0074174 A1 | 3/2007 | Thornton | |
| 2007/0121651 A1 | 5/2007 | Casey et al. | |
| 2007/0127691 A1 | 6/2007 | Lert | |
| 2007/0127703 A1 | 6/2007 | Siminoff | |
| 2007/0130260 A1 | 6/2007 | Weintraub et al. | |
| 2007/0133771 A1 | 6/2007 | Stifelman et al. | |
| 2007/0149166 A1 | 6/2007 | Turcotte et al. | |
| 2007/0153711 A1 | 7/2007 | Dykas et al. | |
| 2007/0167170 A1 | 7/2007 | Fitchett et al. | |
| 2007/0192629 A1 | 8/2007 | Saito | |
| 2007/0208862 A1 | 9/2007 | Fox et al. | |
| 2007/0232284 A1 | 10/2007 | Mason et al. | |
| 2007/0242626 A1 | 10/2007 | Altberg et al. | |
| 2007/0265073 A1 | 11/2007 | Novi et al. | |
| 2007/0286180 A1 | 12/2007 | Marquette et al. | |
| 2007/0291905 A1 | 12/2007 | Halliday et al. | |
| 2007/0293200 A1 | 12/2007 | Roundtree et al. | |
| 2007/0295803 A1 | 12/2007 | Levine et al. | |
| 2008/0005275 A1 | 1/2008 | Overton et al. | |
| 2008/0025320 A1 | 1/2008 | Bangalore et al. | |
| 2008/0037715 A1 | 2/2008 | Prozeniuk et al. | |
| 2008/0037746 A1 | 2/2008 | Dufrene et al. | |
| 2008/0040484 A1 | 2/2008 | Yardley | |
| 2008/0052395 A1 | 2/2008 | Wright et al. | |
| 2008/0091843 A1 | 4/2008 | Kulkarni | |
| 2008/0101571 A1 | 5/2008 | Harlow et al. | |
| 2008/0104348 A1 | 5/2008 | Kabzinski et al. | |
| 2008/0134049 A1 | 6/2008 | Gupta et al. | |
| 2008/0139166 A1 | 6/2008 | Agarwal et al. | |
| 2008/0146268 A1 | 6/2008 | Gandhi et al. | |
| 2008/0152101 A1 | 6/2008 | Griggs | |
| 2008/0154601 A1 | 6/2008 | Stifelman et al. | |
| 2008/0155029 A1 | 6/2008 | Helbling et al. | |

(56) References Cited

U.S. PATENT DOCUMENTS

| | | |
|---|---|---|
| 2008/0162482 A1 | 7/2008 | Ahern et al. |
| 2008/0165708 A1 | 7/2008 | Moore et al. |
| 2008/0177883 A1 | 7/2008 | Hanai et al. |
| 2008/0209050 A1 | 8/2008 | Li |
| 2008/0222656 A1 | 9/2008 | Lyman |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0063502 A1* | 3/2009 | Coimbatore ...... G06F 17/30893 |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0232289 A1 | 9/2009 | Drucker et al. |
| 2009/0235349 A1 | 9/2009 | Lai et al. |
| 2009/0252159 A1 | 10/2009 | Lawson et al. |
| 2009/0276771 A1 | 11/2009 | Nickolov et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0037204 A1 | 2/2010 | Lin et al. |
| 2010/0070424 A1 | 3/2010 | Monk |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0115041 A1 | 5/2010 | Hawkins et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2010/0251340 A1 | 9/2010 | Martin et al. |
| 2010/0281108 A1 | 11/2010 | Cohen |
| 2010/0291910 A1 | 11/2010 | Sanding et al. |
| 2011/0029882 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0310902 A1 | 12/2011 | Xu |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0079066 A1 | 3/2012 | Li et al. |
| 2012/0083266 A1 | 4/2012 | VanSwol et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0173610 A1 | 7/2012 | Bleau et al. |
| 2012/0174095 A1 | 7/2012 | Natchadalingam et al. |
| 2012/0179907 A1* | 7/2012 | Byrd ...................... H04L 9/3268 713/156 |
| 2012/0180021 A1* | 7/2012 | Byrd ...................... G06F 21/604 717/100 |
| 2012/0180029 A1* | 7/2012 | Hill ........................... G06F 8/70 717/135 |
| 2012/0198004 A1 | 8/2012 | Watte |
| 2012/0201238 A1 | 8/2012 | Lawson et al. |
| 2012/0208495 A1* | 8/2012 | Lawson ............ H04M 15/8278 455/406 |
| 2012/0226579 A1 | 9/2012 | Ha et al. |
| 2012/0239757 A1 | 9/2012 | Firstenberg et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0047232 A1* | 2/2013 | Tuchman ............... H04L 9/3226 726/7 |
| 2013/0054684 A1 | 2/2013 | Brazier et al. |
| 2013/0058262 A1 | 3/2013 | Parreira |
| 2013/0067448 A1 | 3/2013 | Sannidhanam et al. |
| 2013/0097298 A1* | 4/2013 | Ting ................... H04N 21/4143 709/223 |
| 2013/0156024 A1 | 6/2013 | Burg |
| 2013/0179942 A1* | 7/2013 | Caplis ..................... H04L 67/28 726/3 |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2014/0064467 A1 | 3/2014 | Lawson et al. |
| 2014/0105372 A1 | 4/2014 | Nowack et al. |
| 2014/0106704 A1 | 4/2014 | Cooke et al. |
| 2014/0123187 A1 | 5/2014 | Reisman |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0274086 A1 | 9/2014 | Boerjesson et al. |

(56) References Cited

U.S. PATENT DOCUMENTS

| | | |
|---|---|---|
| 2014/0282473 A1 | 9/2014 | Saraf et al. |
| 2014/0355600 A1 | 12/2014 | Lawson et al. |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0181631 A1 | 6/2015 | Lee et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 02087804 | 11/2002 |
| WO | 2006037492 A | 4/2006 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

OTHER PUBLICATIONS

Complaint for Patent Infringement, *Telinit Technologies, LLC* v. *Twilio Inc.*, dated Oct. 12, 2012.
RFC 3986: Uniform Resource Identifier (URI): Generic Syntax; T. Berners-Lee, R. Fielding, L. Masinter; Jan. 2005; The Internet Society.

\* cited by examiner

… (1)

SYSTEM AND METHOD FOR OFFERING A MULTI-PARTNER DELEGATED PLATFORM

CROSS-REFERENCE TO RELATED APPLICATIONS

This application claims the benefit of U.S. Provisional Application Ser. No. 61/752,123, filed on 14 Jan. 2013, which is incorporated in its entirety by this reference.

TECHNICAL FIELD

This invention relates generally to the API platform field, and more specifically to a new and useful system and method for offering a multi-partner delegated platform in the API platform field.

BACKGROUND

Business to developer based companies have found ways to market developer-focused products. Developer platforms that provide services and resources through an application programming interface (API) are widely used by developers and companies building other products. Such developer API platforms require considerable resources and operational commitment to create and maintain. API platforms however can sometimes be limited in the audiences they can target. There are often partners willing to offer the same service, but building the infrastructure is often technically challenging, a long process, and costly. Further, users of a potential partner will often have an established relationship with the partner and introducing a new party may be potentially confusing or disruptive to the provided service. Thus, there is a need in the API platform field to create a new and useful system and method for offering a multi-partner delegated platform. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Provisioning a Platform

Figure 1:
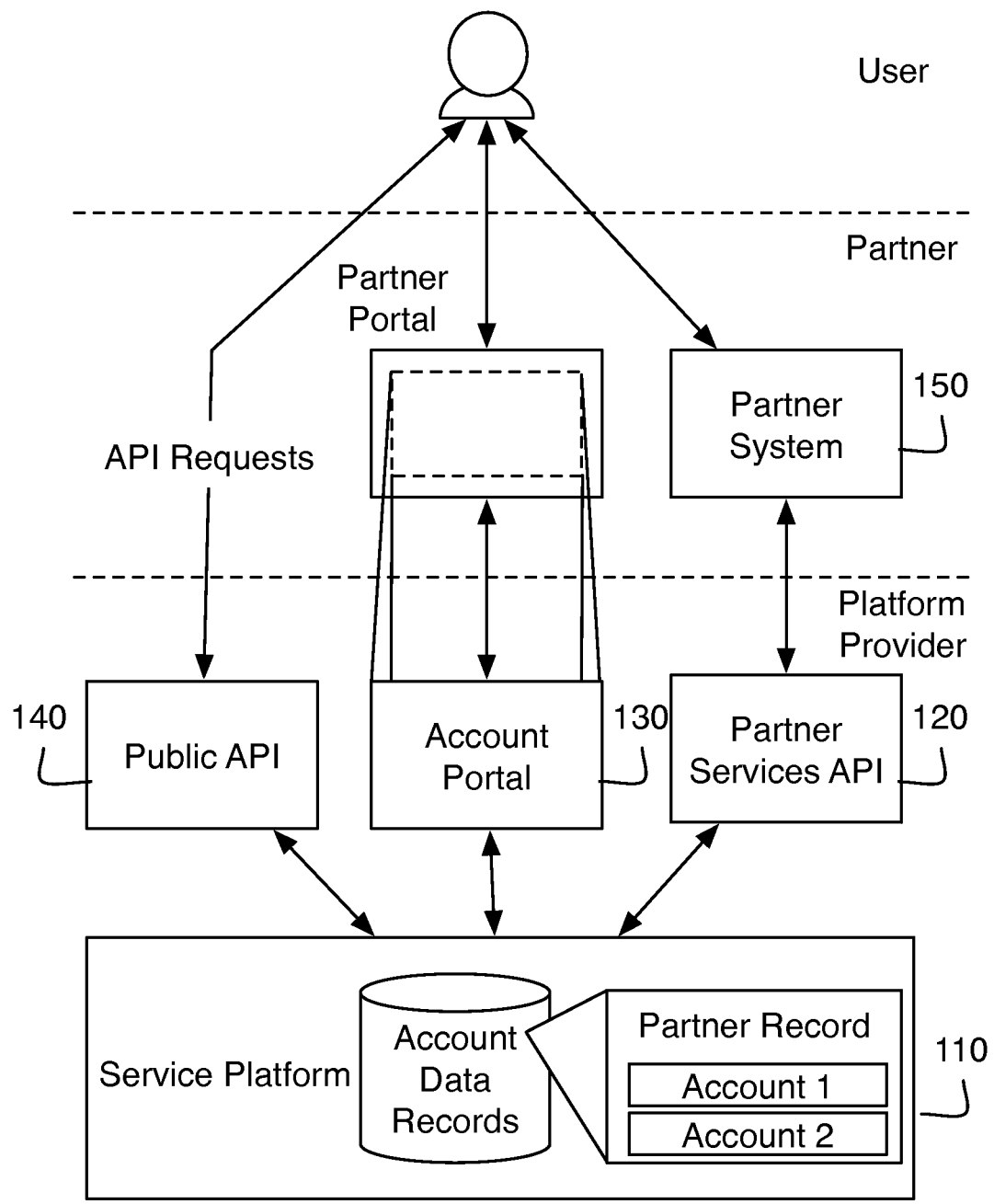
FIG. 1 is a schematic representation of a system of a preferred embodiment of the invention.
Figure 2:
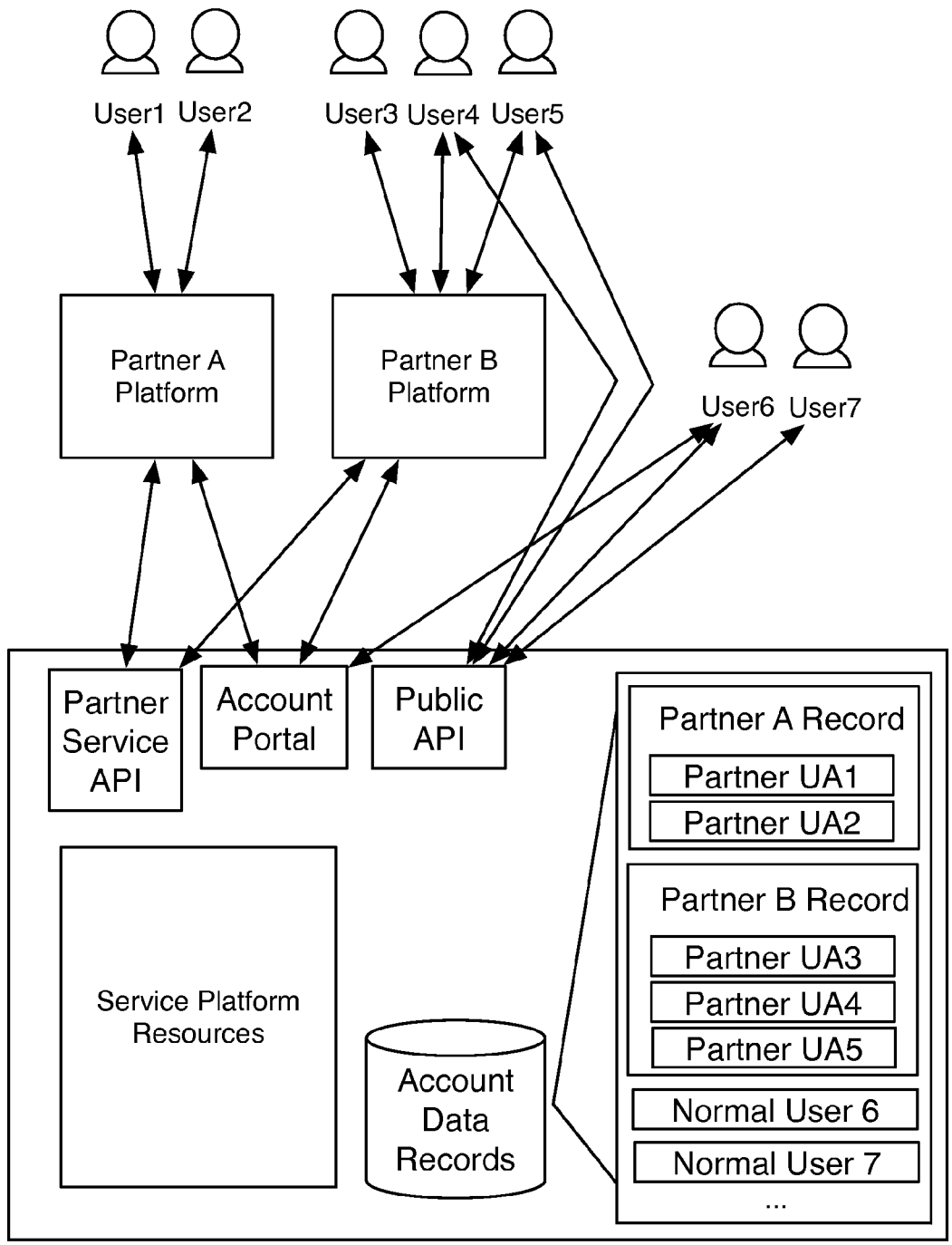
FIG. 2 is a schematic representation of a system with multiple partner relationships.
Figure 3:
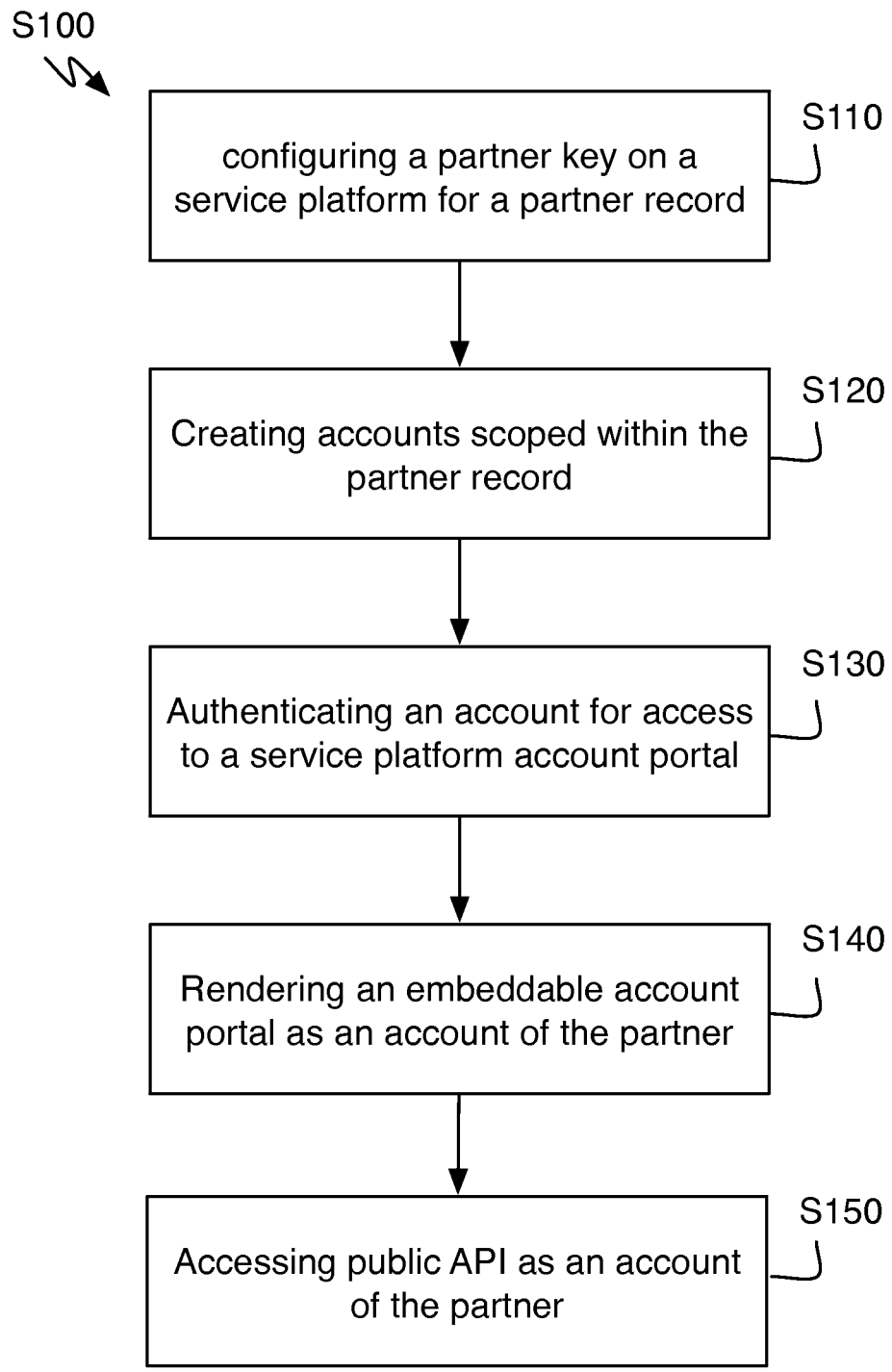
FIG. 3 is a flowchart representation of a method of a preferred embodiment of the invention.

As shown in FIG. 1, a system for provisioning a platform of a preferred embodiment can include a service platform no, a partner services API 120, an account portal 130, and a public API 140 of the service platform. The system functions to allow a platform provider to enable partner entities to provide a computing platform based on the platform of the platform provider. In some scenarios, this would enable companies to rebrand a platform that leverages the infrastructure and services of an underlying service but offered by, provided by, or integrated with an outside partner. A partner would be able to create a user portal where users interface with the partner but using the services of the platform provider. Additionally, the system can be configured for API integration between the platform, user accounts, and the service platform no. This can be particularly valuable in enabling a platform to reach a wider audience. In some cases, partners may have strategic or entrenched user bases that could greatly benefit from the infrastructure and services provided by the platform provider. A partner utilizing the system can appear to provide the underlying platform services and infrastructure. In one preferred variation, the underlying service platform no is transparent to the end user despite the user possibly having direct interactions with components of the service platform 110 such as APIs and admin controls. In an alternative variation, the service platform 110 may be exposed to end-users but integrated for seamless transitions between components of the partner and components of the service platform no. The system can preferably be used such that a plurality of partner-platform relationships may be established as shown in FIG. 2. Additionally, the system can operate while the service platform no and/or the platform maintains accounts and offerings independent of the partner and service provider relationship. The system further enables the platform to be customized and adjusted so that the platform can be tailored to the design specifications of the partner.

The service platform 110 functions to provide basic service functionality. The service platform can provide any suitable service. Preferably, the service platform no includes a public API 140 that facilitates some programmatic service, such as telephony application platform, data processing service, payment service, resource hosting platform, security service, analytics service, mapping service, and/or any suitable programmatic service or platform. In many cases, the platform no provides offerings that require considerable investment in infrastructure, maintenance, development, or other factors, and in particular the offerings are aligned with industry of other key players that can act as partners. In these cases, it may not be feasible to offer the platform 110 as a whitelisted service since there may be an economy of scale or efficiencies or other benefits to having a single platform. In a preferred variation, the service platform no is a telephony/communication application platform such as the one described in U.S. patent application Ser. No. 12/417,630, filed 2 Apr. 2009, titled "SYSTEM AND METHOD FOR PROCESSING TELEPHONY SESSIONS", which is hereby incorporated in its entirety by this reference. A telephony or communication based platform can provide routing, communication based application execution, communication analytics, multi-modal communication bridging, programmatic control of communications, and/or other suitable telephony or communication features. In one variation, a communication service platform 110 can offer application interaction for various modes of communication including PSTN telephony, SIP voice communication, voice IP client communication, video communication, screen-sharing, multimedia synchronous communication, text messages (e.g., SMS messaging and IP-based client messaging), media messaging (e.g., MMS messaging and IP-based client messaging), asynchronous messaging, and/or any suitable form of communication. Such an exemplary service platform 110 can be suitable for integration with large telecommunications company partners. For example, phone company ABC may want to offer its subscribers/customers the option of using particular features offered by the platform; phone company ABC can transparently delegate the features of the platform to the service provider no. In this document, the telephony application service platform may be used for exemplary explanation but any suitable service platform may alternatively be used.

The service platform no preferably includes account constructs, where platform usage requires authenticating as a user and then accessing or using resources of the service platform. The service platform no is preferably a multi-tenant platform where there is a plurality of accounts on the service platform no. Some of these can be accounts scoped to or under a partner account, but some accounts can be independently maintained by the service platform provider as shown in FIG. 2. For example, platform X can have users sign up and use the platform directly through user-facing interfaces of platform X, and platform X can simultaneously have users sign up and use the platform through a partner interface where the users may be unaware of the entity offering platform X. In some variations, the service platform may be a usage-based service, where usage is metered and billed appropriately to the account. The service platform no preferably includes an account data record. The account data record preferably stores account information in a database. The account data record additionally stores a relationship to a partner record for any partner associated with the account. Each partner will typically include partner created and controlled accounts, which we refer to below as "partner accounts" or "partner user accounts". Any suitable data model architecture can be used to represent the relationship between partner of a partner record and the partner user account. A partner record preferably stores the account/customer details of a partner. Each partner account is preferably scoped such that account information is sandboxed and inaccessible by other accounts using the service platform. Partner accounts preferably use the service platform in a manner substantially similar to non-partner accounts. However, partner accounts can additionally include partner limits. The limits may be applied to all accounts of a partner record or individually set for accounts of the partner record. For example, an account of a partner may have certain API features deactivated according to settings of the partner. Similarly, partner-only features may be enabled for partner accounts. Additionally, partner accounts can be authenticated on behalf of a partner. The system can include partner keys that are stored as part of or referenced by a partner record. Partners are preferably vetted and trusted entities. The partner key can be used by the partner to create a digital signature specifying a user (i.e., a partner account) to authenticate on behalf of a user, which functions to enable the partner to manage their own user accounts and sign them in to a user account of the service platform 110 without receiving authentication credentials from the end user.

The partner services API 120 functions to interface with a partner service platform 150. The partner services API 120 preferably enables partner record and account configuration. A partner services API 120 preferably uses a partner authentication token to authenticate a partner. Through the API a partner can preferably create accounts, suspend accounts, purchase apps, change settings of an account, access usage of an account, or perform any configuration with the service platform no. A partner can be any suitable entity. Typically, a partner will be a company in a related market to the service platform. For example a telephone carrier may act as a partner in the example where the service platform is a telephony application platform. The partner may alternatively be any suitable entity. A partner will typically programmatically use the partner services API 120 according to user interactions with a partner application or platform. The partner typically handles acquiring users/customers, and users will establish or will have pre-existing account relationships with the partner. The partner will additionally manage the user relationship such as handling billing, customer support, communication, and any other aspects of the relationship. A user will typically interface predominantly with the partner and may even be unaware of the use of the underlying service platform. For example, a user will go to a website of a partner, create an account with the partner, and pay any billing fees to the partner. The partner will transparently use the partner service API 120 to create an account for the user within the partner record on the service platform and pay bills of an account to the service platform 110. The platform API is preferably a subset of API features of an internal service platform API 120. Within a service platform there can be numerous interactions that are achieved through internal APIs. Some of these interactions such as billing and management of accounts may not be exposed to general users as it relates more to operational features rather than the service offered by the platform, however some of these interactions may be opened to partners through the platform API. All or a subset of service level functionality can be provided by the service platform through the partner. The partner API can additionally be restricted, limited, or filtered to only known machine addresses associated with the partner. For example, a set or block of IP addresses may be configured for partner API access for a particular partner. Partner API requests of a partner not from the configured IP addresses may be disregarded or blocked.

In some alternative embodiments, the system can additionally include partner service platforms 150, which function to provide the user facing functionality. The partner service platform 150 as described above is preferably a computing application, platform, service, or infrastructure system with networking capability to interface with an outside service platform. A partner service platform 150 can be a telecommunications service, a payment service, a resource-hosting platform, a security service, an analytics service, a mapping service, and/or any suitable programmatic service or platform. The partner service platform 150 preferably stores a partner key that is used to in communicating verified authentication requests on behalf of users. The partner service platform 150 can include an internal account system, which is preferably separate and distinct from an account system of the service platform and possibly other partner service platforms 150. The partner service platform 150 can stores an association between an account of the partner service platform and the account identifier used to identify a partner user account in the service platform. The partner service platform 150 is preferably additionally configured to follow the authentication steps to authenticate on behalf of a partner user account, and further configured to embed an account portal as desired.

The account portal 130 functions to provide users access to account features of a service platform no. An account portal 130 is preferably a service platform configuration interface. Typically the interface is a webpage, but may alternatively be application views. On an exemplary telephony application platform, an account portal 130 may allow a user to view call analytics, configure telephony number applications, purchase and remove telephony endpoints, view account tokens, and/or perform any suitable user account related interactions. The account portal 130 is preferably embeddable within a partner portal. A partner portal will typically include the account portal by using an iframe and authenticating account portal access as a partner account. The partner can use the partner key to authenticate as a partner account on behalf of a user of the partner. In this arrangement, the account portal functions to provide a configured user interface within the webpage or application of the partner. The account portal 130 may alternatively be embedded by dynamically constructing the account portal view (e.g., using a JavaScript to construct the account portal within the webpage of the partner portal.). The account portal may additionally include a customization module that can dynamically customize the account portal interface and interactions according to partner record settings. The customization module functions to allow a partner to tailor the presentation and capabilities of the account portal. In one example, a carrier partner may want to limit purchasable telephone endpoints to telephone numbers owned by the carrier. In another example, the partner may want to set the presentation of the interface to stylistically match the partner portal—the graphical styling, logos, and layout can be adjusted according to partner settings. Additionally, the partner portal can be augmented to integrate resources of the partner. Links in the interface can reference resources of the partner and/or content can be pulled or embedded within the account portal 130. For example, the partner may provide a customer support system, which can be used as an alternative to the customer support page of the account portal 130.

The public API 140 of the service platform functions to provide API access to the service platform no. The public API 140 is preferably used by partner accounts in a manner substantially similar to how the public API is used by regular accounts of the service platform. Service platform restrictions of a partner account may be enforced that limit, enable, or modify particular API requests made through the public API 140. The public API 140 may additionally include a redirection API. API calls are typically communicated to a URI resource. In directing the API calls to the service platform URI, the presence of the service platform will be exposed to a user of a partner. The redirection API is preferably a mirror of the service platform API but using a domain associated with the partner. API calls to the partner redirection API are preferably automatically redirected to the public API of the service platform. In one variation, a CNAME DNS record can be modified to redirect API requests addressed to a partner themed resource identifier.

2. Method for Provisioning a Platform

Figure 4:
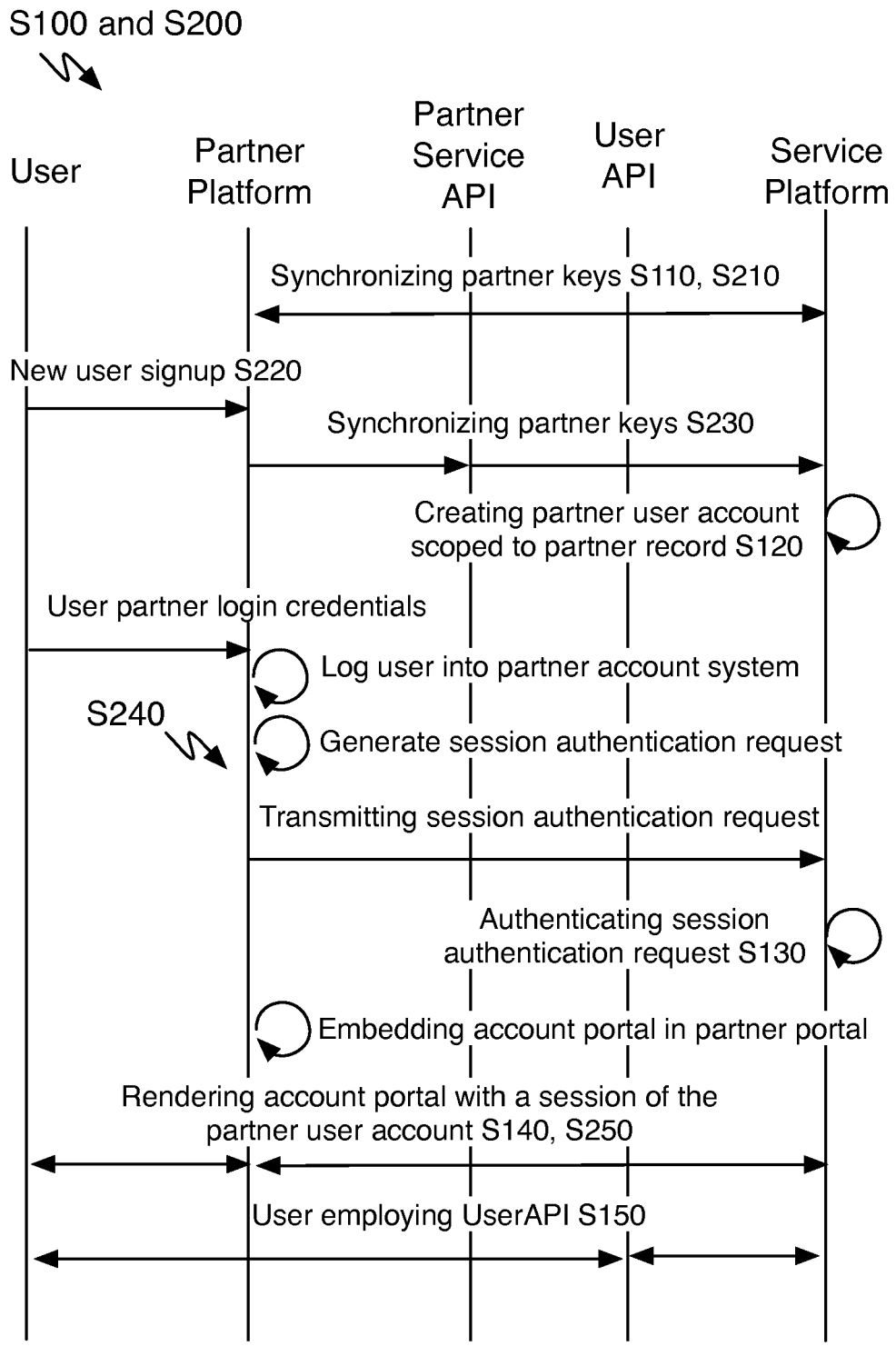
FIG. 4 is a communication flow representation of a method of a preferred embodiment of the invention.

As shown in FIG. 2, a method S100 for provisioning a platform of a preferred embodiment may include configuring a partner key on a service platform for a partner record S110, creating accounts scoped within the partner record S120, authenticating an account for access to a service platform account portal S130, and rendering an embeddable account portal as an account of the partner S140. The method can function to enable an authorized impersonation authentication system. In use, the method enables a service platform to act as a delegate platform to one or more partners, wherein at least a subset of users interface through a partner system. The partner can authenticate a user account, which is preferably applied towards service platform access (e.g., account portal access). More specifically, the method can function to provision service platform functionality to a partner. In other words, an embodiment of the method may allow a partner to rebrand, "grey" label, or delegate functionality to an underlying service platform. The service platform can allow the partner to manage all customer-facing interactions, while the service platform provides underlying service functionality and/or infrastructure. Preferably, the interface between services of the service platform and the partner system are substantially seamless. In one preferred implementation, the service platform is transparent and appears to be a first-party offering of the partner system. In another implementation, the transitioning between the partner system and the service platform is enhanced or automatically bridged to simplify the experience for users. The method is preferably implemented by a system substantially similar to the one described above but any suitable system may alternatively be used. Preferably, the method is implemented by service platform provider, where the platform includes a public API that facilitates some service, such as telephony applications, data processing service, payment service, resource hosting, security service, analytics service, mapping service, and/or any suitable programmatic service. In a preferred variation, the service platform is a telephony/communication application platform such as the one described above. But the method may be used in any suitable application of authentication and/or service platform provisioning. The method is preferably implemented in coordination with actions of at least one partner service as shown in FIG. 4.

Figure 5A:
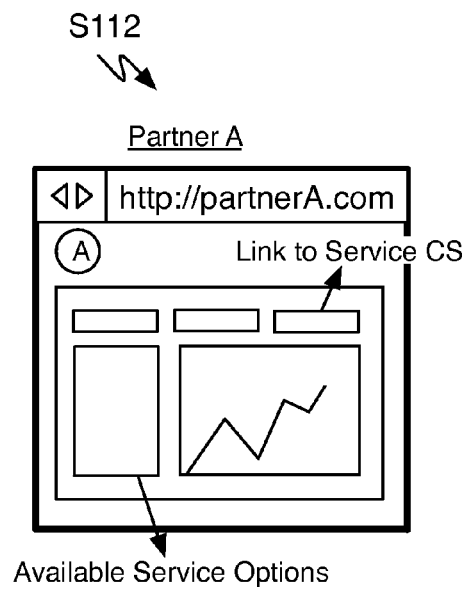
FIGS. 5A-5C are schematic representations of configuring customization of the service platform scoped to different partner accounts.
Figure 5B:
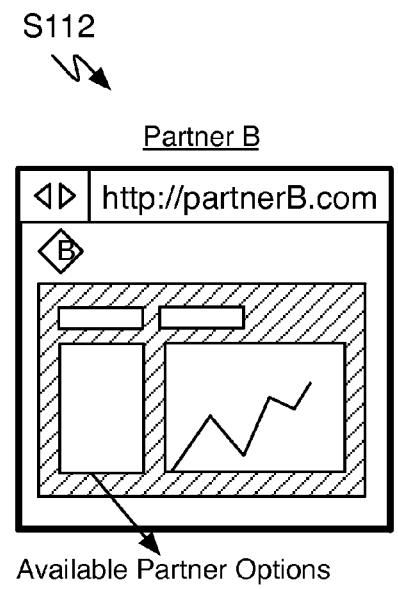
Figure 5C:
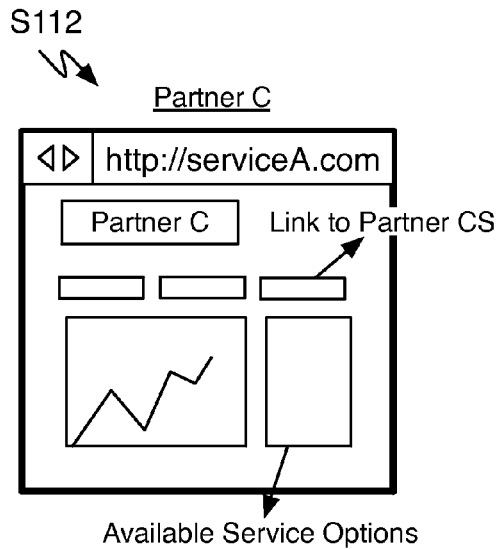

Block S110, which includes configuring a partner key on a service platform for a partner record, functions to setup a partner for managing partner services. A service platform preferably creates a partner record within account data records. A partner record can be initially created when entering a partner relationship with an outside entity (i.e., a partner). A partner is preferably a trusted entity, and permission to become a partner may be accompanied by various enrollment processes. While multiple partners can be serviced simultaneously through this method, self-enrollment may not be enabled. Creation of a partner record can be created within the service platform through an administrator interface of the service platform and API request or through any suitable interface. The partner record preferably stores configuration settings of the partner and also accounts of the partner. The partner record is any suitable form of data model to represent settings of a partner and association between the partner and accounts under the partner control. The method can additionally include configuring customization of the service platform scoped to the partner account S112. In one variation, some parameters can be set with permissions to be controlled by the partner, such as by using the partner services API, and some parameters can be secured for service platform administrator control. Partner controlled customization parameters can be templating configuration (e.g., visual templating of the account portal), overriding service platform resources (e.g., accessing database records of the partner instead of the service provider), overriding interaction flow (e.g., linking to partner customer support instead of customer support of the service platform), and/or any suitable setting visible to the partner as shown in FIGS. 5A-5C. Partner parameters that may not be exposed to the partner can include exposed partner service API features, features exposed to partner user accounts in the public API, and/or other suitable limits that may be put in place by operators of the service platform. The limits can be on the features exposed to the partner and/or the features exposed to users that go through the partner. The settings of the partner record can function to provide a wide variety of customized integration with a partner system.

A partner key is preferably stored in connection with a particular partner record. The partner key is preferably an authentication key that can be used to authenticate the partner when interfacing with the service platform through the API. The partner key is preferably a shared secret cryptographic key, and is also known by the partner. The partner key can be generated by the service platform and shared with the partner. Alternatively, the partner key can be configured and synchronized between the service platform and the respective partner in any suitable manner. The partner key is preferably used along with a partner service API to authenticate partner service level API requests as described below. The partner key can be used to verify the identity of particular requests as originating from the partner. As the partner is a trusted entity, the partner can be granted privilege to vouch for a user and impersonate the user when interacting with an account of the user. The partner service API may be used to interface with a partner account such as by creating a user account, deleting a user account, updating a user account, configuring partner customizations, and/or performing any suitable partner action. The partner record can additionally include a parameter defining restricted access to the partner service API. A set of IP addresses can be set that defines a white listed set of IPs that can be allowed to access the partner service API through.

Block S120, which includes creating accounts scoped within the partner record, functions to create partner accounts associated with the partner. Accounts within a partner record are records that are controlled and administered by a partner. A partner typically will acquire a new user through a partner website, service, or other component of partner system. The partner can manage any suitable user account information that is relevant to the partner on a system operated by the partner, but the partner preferably additionally creates a partner user account on the service platform for the new user through the partner service API. For example, a partner may have an existing user for which they have a user account and related allocated resources. At some point, this existing user, which exists within the account system of the partner system, may be upgraded or enable the capability to use the service platform. The service platform operates with its own account system, and accordingly needs an account object to use in connection with the user of the partner. However, the partner may want to avoid the user from maintaining a separate and different user account—the partner can programmatically create a partner user account through the partner services API where the partner user account is associated with the user. The user may be unaware of the second account within the service platform and may never create a special username and password to access that second account.

An API request to create a new user is preferably authenticated using the partner key. If the authentication validates the partner key then a new account can be created associated with the partner record. If the request is found to be invalid, the request is preferably denied. Any suitable approach may be used to authenticate partner level API requests. Any number of accounts may be created associated with the partner record. Additionally, creating accounts may include account customization. Account customization may be globally applied to all accounts of a partner or may alternatively or additionally be applied to a specific subset of accounts of a partner record. Account customizations may include platform restrictions. Certain features of a platform may be disallowed (or alternatively enabled) for an account. In the telephony application platform example, an account may be prevented from performing SMS messaging. In another example, particular API calls may be allowed, disallowed, or otherwise restricted for a particular account. Account customizations may alternatively include usage limits (e.g., amount of usage). The accounts of a partner record are preferably scoped to remain secure and inaccessible from outside accounts (e.g., other partner accounts).

Block S130, which includes authenticating an account for access to a service platform account portal, functions to allow a user to access a service portal through a partner portal. A partner will typically have a user portal or account page, from which the user can manage a service apparently provided by the partner. In reality, the user is managing a service accessed through a partner but provided by a service platform. An account is preferably authenticated by authenticating a request by the partner. In one embodiment, a partner signs an authentication request including the account ID to authenticate. The request is preferably signed with the partner key. The service platform preferably verifies that the request is signed by the partner and that the account ID is a valid account associated with the partner record. The authentication process can rely upon the trusted partner relationship.

Figure 6:
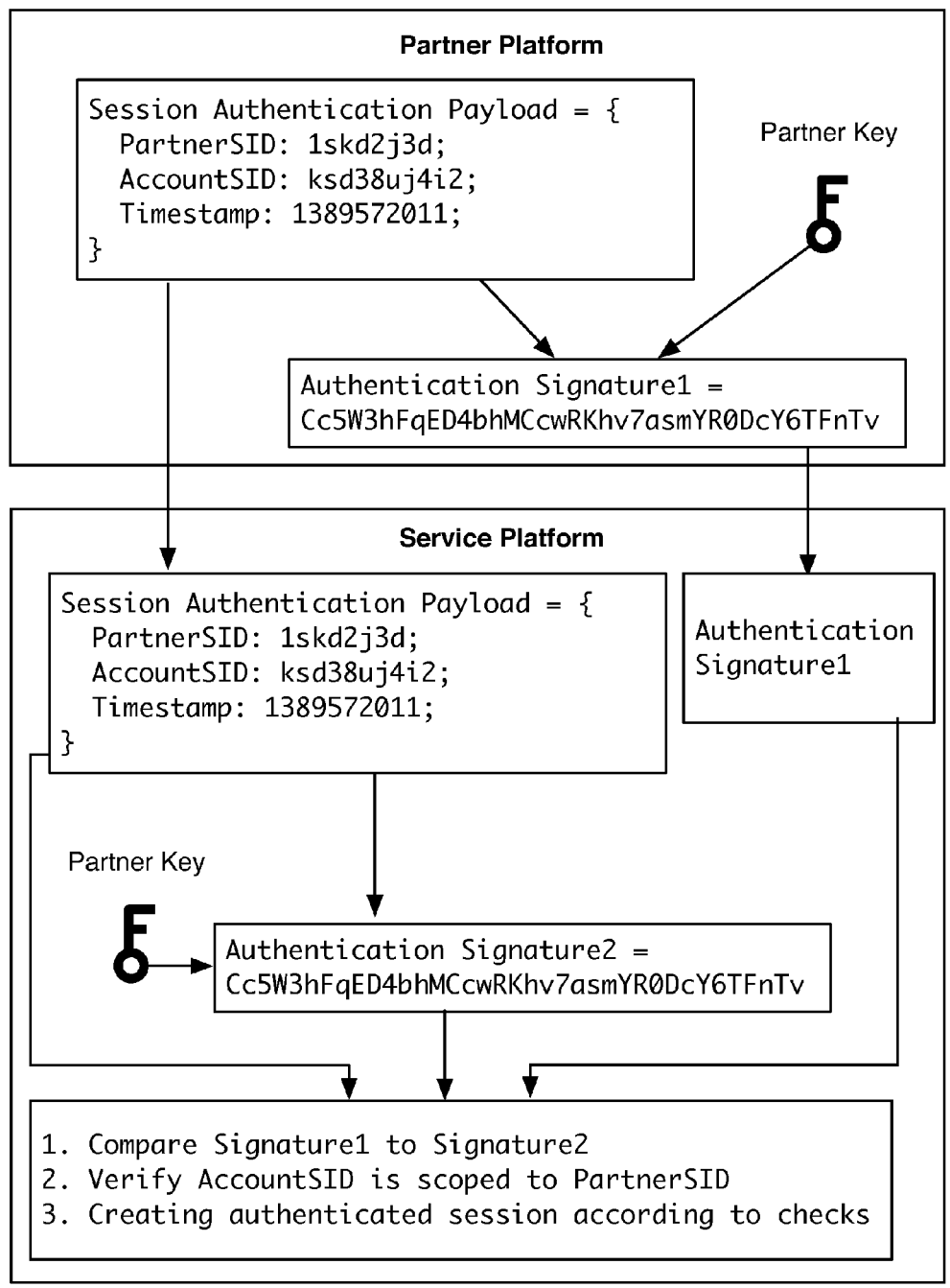
FIG. 6 is a schematic representation of a preferred variation of authenticating an account for access to an account portal.
Figure 7:
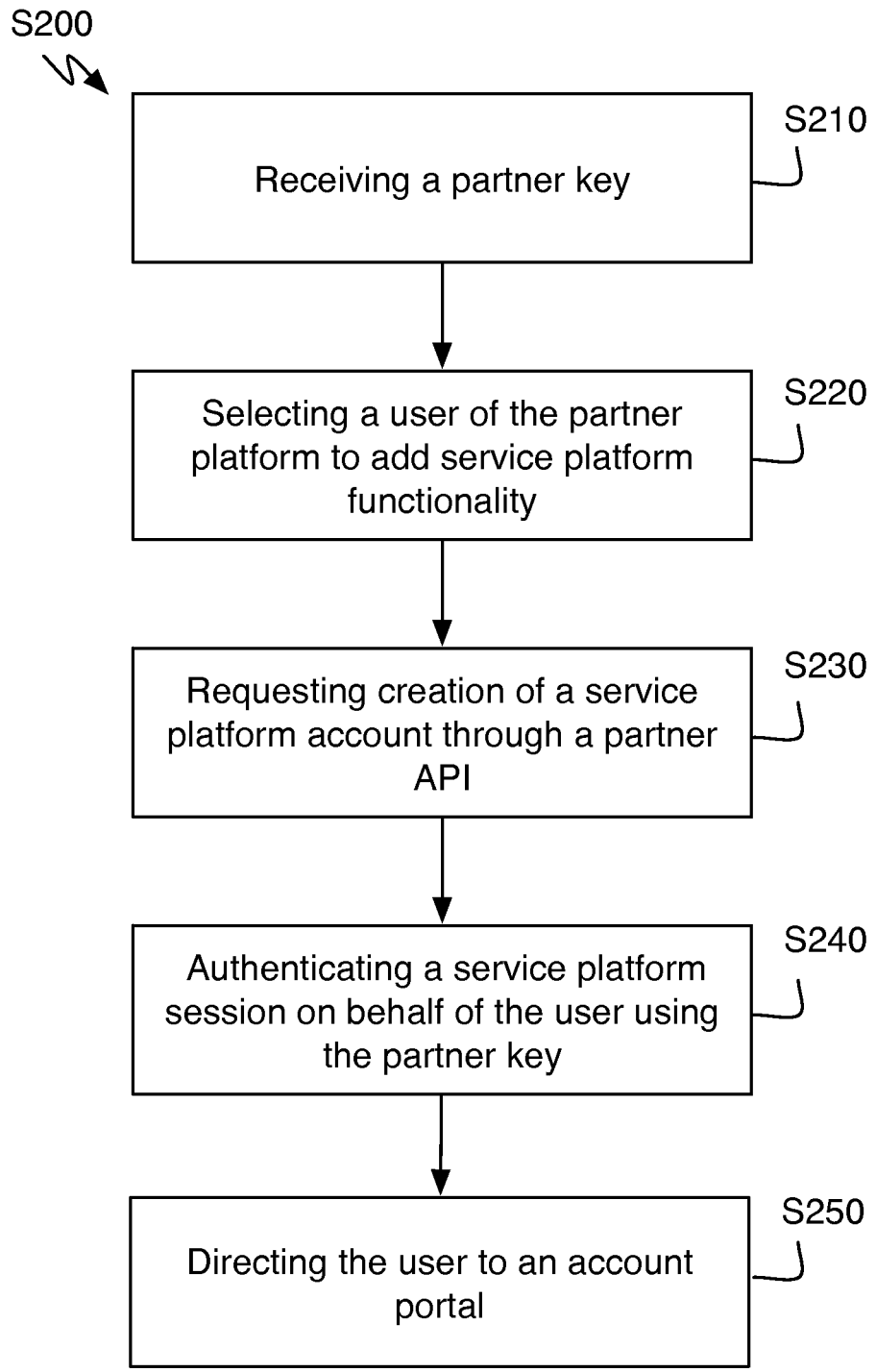
FIG. 7 is a flowchart representation of a method of a preferred embodiment of the invention.

In one specific implementation shown in FIG. 6, the partner packages key information as an authentication payload, which can include a partner secure identifier and an account secure identifier and optionally additional information such as a user secure identifier (if accounts have a concept of users or sub-accounts), a timestamp, a nonce, and/or any suitable parameter. The account secure identifier can previously have been stored in association with the user account in the partner system, such as during creation of the account. The partner then signs the authentication payload, generating an authentication signature. The authentication payload and signature are transmitted to the service platform where the method comprises: through the service platform API, the service platform receiving the authentication payload and the authentication signature; validating the authentication request made on behalf of partner user account; and creating an authenticated session. Validating the authentication request can include generating an authentication signature using the authentication payload and the partner key of the service platform. If the authentication signature matches the received authentication signature then the authentication request can be confirmed as authentic. If the authentication signature generated at the service platform does not match the received authentication signature then the authentication request is denied. Creating an authentication session can result in redirecting the user to an embedded account portal or redirecting a standalone account portal. Redirecting to a standalone account portal can direct the browser to an account portal of the service platform, which is preferably un-embedded. The account portal can be specifically selected and configured for the partner associated with the account.

A partner may be enabled to authenticate any account associated with a partner record. For example, a user authenticates against an account system of the partner, and if the authentication is verified at the partner, the partner programmatically vouches for the user and uses the partner key to authenticate user login with the service platform. Such authentication can be synchronous to and responsive to user directions and interactions. The authentication process may additionally find application to other fields such as enabling an impersonation authentication process. In other variations, the authentication of user made by the platform can be asynchronous to user interactions. This may be used in various situations such as allowing administrators or IT departments to login as a user to troubleshoot a problem without requiring the user to login using account credentials or performing a background process automatically on behalf of the users.

Authentication can additionally include other alternatives and variations. As one additional variation, partner authentication can include additional factors of authentication, and more specifically a trusted device can be used as a second factor of authentication. During user registration, a second factor authentication device identifier can be specified, which the service platform or a third party service can use to verify user intent to access the service platform. In an alternative embodiment, the partner can create and store generated user credentials, and the generated user credentials are then used to authenticate users accessing the service platform.

Block S140, which includes rendering an embeddable account portal as an account of the partner, functions to include an account portal interface within an interface of the partner. An account portal is preferably rendered when a user is attempting to access the administration tools or user interface tools for the functionality provided by the service platform provider. This can be included as a subset of the administration user interface tools offered by the partner. The account portal is preferably rendered specifically for the authenticated account. Account information, settings, application or data access, and other account level access are preferably provided through the account portal. Since the user of the account may only have knowledge of the partner entity, the account portal may be embedded within a portal of a partner (e.g., website or application interface). The account portal is preferably embedded as an iframe on the partner portal. The account portal may alternatively be embedded by building an interface from a script. For example, JavaScript may authenticate access to a portal as an account of the partner, and then the DOM objects are programmatically constructed to present the account portal. The account portal may alternatively be embedded using any suitable technique. The partner portal is typically hosted on any suitable server or application of the partner. The account portal is preferably hosted or provided by the service platform. In the telephony application example, an account portal may be used for configuring application URI's for telephony numbers, purchasing communication endpoints, viewing analytics and logs, setting billing information, and/or any suitable account level settings of a telephony application. The partner portal, which embeds the account portal can provide additional partner level services. For example, if the partner is a telecom company, the user may be able to manage their phone, internet, and/or other telecommunications contracts—by navigating to a telecommunications applications section in the partner portal the user can access the embedded account portal provided by the service platform. While the account portal is preferably a single object embedded in a single portion, multiple account portal components can be used and embedded in various portions of the partner portal. For example, a billing account portal widget can be embedded on a billing page of the partner portal alongside other partner related billing; a usage account portal widget can be embedded on a usage page of the partner alongside usage within other features of the partner service; and a configuration account portal can be presented within a page specific for the platform service.

Rendering an embeddable account portal may additionally include rendering a customized embeddable account portal. One customization option includes feature customization of the portal. Similar to the account customization, a portal can have features disabled or enabled. Certain features may not be rendered based on the partner or the partner account. In one example, a partner may be a particular telephony carrier. The telephony carrier may only want to sell telephone numbers form a telephone inventory belonging to that telephony carrier. Thus, the portal embedded by the telephone carrier preferably only has options to buy telephone numbers that belong to that telephone carrier. Customizing the account portal can include retrieving partner resources and integrating the partner resources into the account portal, which functions to embed dynamic information, application logic, or other resources into the account portal. In the example above, the telephone inventory of a partner may be communicated to the service platform through a standardized interface to customize the experience of the account portal as shown in FIG. 5B with the available partner options. As another customization variation, the partner can set configuration of the account portal (e.g., through the partner record) such that references in the account portal link to resources of the partner. For example, an account portal may include a customer support link and related resources to provide the customer support as shown in FIG. 5A. However, if a partner wanted to handle his or her own customer support, the link to the customer support portion of the account portal can link to the customer support page provided by the partner as shown in FIG. 5C. Additionally, customization may include visual customization such as styling, graphics, or layout of components of the embedded portal. Customizations of a portal are preferably set in a partner record or in a partner account record. The customization settings are preferably accessed and used in rendering the account portal. They may alternatively be set through any suitable options included in the mechanism used to embed the portal.

Additionally, the method may include accessing public API as a partner account S150. Accounts of a partner are preferably provided the same authentication tools used by other accounts of the service platform. An account of a partner is preferably given an account secure identifier (SID) and an authentication token. The account secure identifier and an authentication token and any additional security tokens or credentials can be communicated through the account portal or other suitable mechanisms. The SID and authentication token may be used by an account to use API resources provided from the service platform. A library or software development kit (SDK) may be provided to facilitate making use of an API. Providing access to the public API enables for programmatic integration of an account with the service platform as opposed to just the account portal. API requests may be communicated directly to the service provider. The presence of the service provider may alternatively be kept transparent. API requests may be sent to resources in a namespace of the partner, but transparently routed or redirected to resources of the service platform. As an API redirection example, instead of sending REST API requests to a standard URI of the service platform, the REST API request can be sent to a URI seemingly hosted by the partner, but that is redirected to the same resource destination of the standard URI of the service platform. As with the customization of the account portal, the API offerings can be similarly customized. Some requests may be set to not be allowed for partner accounts a user account created by a partner can have customized permissions with the REST API.

3. Method for Using a Delegated Service Platform

As shown in FIG. 2, a method S200 for using a delegated service platform of a preferred embodiment can include at a partner platform receiving a partner key S210, selecting a user of the partner platform to add service platform functionality S220, requesting creation of a service platform account through a partner API S230, authenticating a service platform session on behalf of the user using the partner key S240, and directing the user to an account portal S250. The method can function to enable a partner platform to partner with an existing service platform and integrate functionality of the service platform into offerings of the host platform. The method is preferably a detailed description of one possible integration of a partner service with a service provider performing the steps above. The partner platform can similarly be described as the host platform since the host platform preferably implements the method S200 to operate in cooperation with the service platform method S100 as shown in FIG. 4. As with the above method, the method can function to enable an authorized impersonation authentication system with an outside entity (i.e., the service platform). A partner service can implement method S200 any suitable number of times with different service platforms. Method S200 can be implemented by any suitable entity. Frequently, the partner or "host" will operate in a related field as the service platform but without direct overlap such as in the telecom company example used above. In some cases, the host will have a set of features and products offered through a platform and the service platform can be one of many offering. In other variations, an entity may want to see an existing user base and branding to promote a duplicate service of the service platform. In another use case, an enterprise solution may offer the service platform within an internal enterprise solution.

Block S210, which includes receiving a partner key, functions to transfer a shared cryptographic token between the partner platform and the service platform. The partner key can be transferred to the partner platform in any suitable manner. In one variation, the partner key is transferred in an IP communication. In another variation, the partner key can be configured through an administrator interface or through any suitable interface. The partner key is preferably shared between the partner platform and the service platform. The partner platform preferably stores the partner key in any suitable location for us when acting on behalf of the users. Additionally, the method can include configuring the partner platform for partner services API of the service platform, which can include setting designated machines and/or ports for accessing the service platform.

Block S220, which includes selecting a user of the partner platform to add service platform functionality, functions to initiate the use of the service platform with a user. A user preferably creates an account with the partner platform or has can have an existing account. According to suitable business logic, the partner platform will determine when and which users should be enrolled in the service platform. In one variation, all users of a partner platform are enrolled. Accordingly each user can be selected and individually added to the service platform. New users can be selected to be added when they create an account on the partner platform. In another variation, the service platform may only be enabled if a user of the partner platform enables the service. For example, a user can select an option in a partner portal to begin use of the service platform, at which time, the user is preferably selected to be added. In another variation, only users with particular permissions (e.g., users with a particular service plan tier) may have the service platform enabled.

Block S230, which includes requesting creation of a service platform account through a partner API, functions to communicate with the service platform to initialize a user for use with the service platform. The request is preferably transmitted from the partner platform or system to the service platform or logged in any suitable manner. The service platform account is an account that exists separate from the user account in the partner platform, but a one-to-one relationship preferably exists between platform accounts (on the service platform) and user accounts in the partner platform. The request is preferably transmitted over a partner service API in a manner substantially similar to block S120. The request is preferably cryptographically secured using the partner key or any suitable authentication mechanism.

Block S240, which includes authenticating a service platform session on behalf of the user using the partner key, functions to authenticate a user accessing the service platform. Block S240 preferably includes receiving a user request to access a service platform account portal. The account portal preferably requires a session to be authenticated as some partner account. The partner platform preferably signs a request using the partner key on behalf of the user to establish the session authenticated as the user. The user preferably does not have to provide credentials to the service platform—the user can sign in to the partner platform using a set of authentication credentials (which can be unknown and irrelevant to the service platform) and then in response to user being successfully logged in, the partner platform can vouch for that user. The authentication is preferably substantially similar to that described above. The partner platform assembles account information that can identify the identity of the partner and the identity of the account. The partner key is used to create a digital signature of the account information payload, and then the digital signature and the account payload are transferred to the service platform to be authenticated.

Block S250, which includes directing the user to an account portal, functions to enable user access to the service platform. In a preferred embodiment, the account portal is embedded within a portal of the partner (i.e., the partner portal). The partner portal can embed the account portal as an iframe. The account portal may alternatively be embedded by building an interface from a script included or retrieved in the partner portal. For example, JavaScript may authenticate access to a portal as an account of the partner, and then the DOM objects are programmatically constructed to present the account portal. As described above, the account portal can alternatively be embedded in a partner portal as one or more widgets. Additionally, cross portal messaging can be applied to integrate the interactions of the partner portal with the interactions in the account portal. In an alternative embodiment with less embedded integration, the partner portal redirects the user to an account portal distinct from the partner portal. In a browser, this can be reflected through the differing domain names between the partner portal and the account portal. Through partner configuration, the account portal can be customized, and actions and links in the account portal can be configured to link back to the partner platform.

In use the method enables a service platform to act as a delegate platform to one or more partners, wherein at least a subset of users interface through a partner system. The partner can authenticate a user account, which is preferably applied towards service platform access (e.g., account portal access). More specifically, the method can function to provision service platform functionality to a partner. In other words, an embodiment of the method may allow a partner to rebrand, "grey" label, or delegate functionality to an underlying service platform. The service platform can allow the partner to manage all customer-facing interactions, while the service platform provides the underlying service functionality and/or infrastructure. Preferably, the interface between services of the service platform and the partner system are substantially seamless. In one preferred implementation, the service platform is transparent and appears to be a first-party offering of the partner system. In another implementation, the transitioning between the partner system and the service platform is enhanced or automatically bridged to simplify the experience for users. The method is preferably implemented by a system substantially similar to the one described above but any suitable system may alternatively be used. Preferably, the method is implemented by service platform provider, where the platform includes a public API that facilitates some service, such as telephony applications, data processing service, payment service, resource hosting, security service, analytics service, mapping service, and/or any suitable programmatic service. In a preferred variation, the service platform is a telephony/communication application platform such as the one described above. But the method may be used in any suitable application of authentication and/or service platform provisioning.

The system and method of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the service platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various components of the system and method.

As a person skilled in the art will recognize from the previous detailed description and from the figures and claims, modifications and changes can be made to the preferred embodiments of the invention without departing from the scope of this invention defined in the following claims.

What is claimed is:

1. A method for delegating functionality of a service platform system comprising: at the service platform system:
   the service platform system configuring a partner key of a partner record on the service platform system with a partner, the partner record being stored by a database of the service platform system, the partner key being synchronized with a partner platform system of the partner of the partner record;
   responsive to an application programming interface (API) request received by a partner services API of the service platform system, the service platform system creating an account scoped within the partner record, the API request being provided by the partner platform system;
   the service platform system receiving a session authentication request that specifies a partner assertion of a partner authenticated session request of the account, the session authentication request specifying an account identifier of the account and a partner identifier of the partner, the session authentication request being provided by the partner platform system;
   the service platform system authenticating the session authentication request with the synchronized partner key;
   responsive to authentication of the session authentication request with the synchronized partner key, the service platform system rendering an embeddable account portal with a session of the account;
   wherein the service platform system authenticating the session authentication request comprises: verifying partner identity, and verifying that the account of the session authentication request is scoped to the partner of the session authentication request,
   wherein the session authentication request includes an authentication payload and a first authentication signature, and
   wherein verifying partner identity at the service platform system comprises the service platform system signing the authentication payload with the synchronized partner key to generate a second authentication signature and confirming partner identity responsive to a determination that the second authentication signature corresponds with the first authentication signature.

2. The method of claim 1, wherein the partner platform system configures customization of the partner; and wherein rendering the embeddable account portal comprises rendering the embeddable account portal with the session of the account and service platform customizations of the partner.

3. The method of claim 1, wherein there are a plurality of partner platform systems with individual partner keys.

4. The method of claim 1, wherein rendering an embeddable account portal with a session of the account comprises augmenting the account portal features to permissions of the partner.

5. The method of claim 4, wherein augmenting the account portal features to permissions of the partner comprises redirecting to partner portal for configured components.

6. The method of claim 5, further comprising distributing API credentials of the account through the account portal; and providing the account access to a public API of the service platform when authenticated with the API credentials of the account.

7. The method of claim 1, wherein the service platform system is a communications application platform system.

8. The method of claim 1, wherein the partner platform system configures customization of the embeddable account portal in the partner record of the service platform system, wherein at least one customization is setting a link to a resource of the partner platform system.

9. The method of claim 1, wherein the partner platform system provides the API request responsive to user interaction.

10. The method of claim 1, wherein the partner platform system provides the API request asynchronous to user interaction.

11. The method of claim 1, wherein service platform system functionality comprises executing communication applications.

12. The method of claim 1, wherein the account scoped within the partner record is scoped to the partner of the partner record, and wherein verifying that the account of the session authentication request is scoped to the partner of the session authentication request comprises: verifying that the partner identifier corresponds to the partner of the partner record.

13. The method of claim 1, wherein the account scoped within the partner record is associated with a selected account within an account system of the partner platform system, the partner platform system selecting the selected account for use of the service platform system.

14. The method of claim 13, wherein the partner platform system generates the session authentication request with the synchronized partner key.

15. The method of claim 14, wherein the partner platform system is external to the service platform system.

16. The method of claim 1, wherein the partner platform system embeds the embeddable account portal within a portal of the partner platform system.

17. A system for delegating functionality of a service platform, the system comprising:
   a service platform system, the service platform system constructed to execute computer-readable instructions to control the service platform system to:
      configure a partner key of a partner record on the service platform system with a partner, the partner record being stored by a database of the service platform system, the partner key being synchronized with a partner platform system of the partner of the partner record,
      responsive to an application programming interface (API) request received by a partner services API of the service platform system, create an account scoped within the partner record, the API request being provided by the partner platform system, receive a session authentication request that specifies a partner assertion of a partner authenticated session request of the account, the session authentication request specifying an account identifier of the account and a partner identifier of the partner, the session authentication request being provided by the partner platform system, authenticate the session authentication request with the synchronized partner key, and responsive to authentication of the session authentication request with the synchronized partner key, render an embeddable account portal with a session of the account; and the partner platform system, the partner platform system constructed to execute computer-readable instructions to control the partner platform system to:

select an account within an account system of the partner platform system for use of the service platform system, wherein the account scoped within the partner record is associated with the selected account, provide the API request, generate the session authentication request with the synchronized partner key, provide the session authentication request to the service platform system, and embed the embeddable account portal within a portal of the partner platform system, wherein the service platform system authenticating the session authentication request comprises: verifying partner identity, and verifying that the account of the session authentication request is scoped to the partner of the session authentication request, wherein the session authentication request includes an authentication payload and a first authentication signature, and wherein verifying partner identity at the service platform system comprises the service platform system signing the authentication payload with the synchronized partner key to generate a second authentication signature and confirming partner identity responsive to a determination that the second authentication signature corresponds with the first authentication signature.

\* \* \* \* \*